US006560042B2

United States Patent
Murata et al.

(10) Patent No.: US 6,560,042 B2
(45) Date of Patent: May 6, 2003

(54) WIDE-ANGLE LENS SYSTEM AND A FOCUSING METHOD THEREOF

(75) Inventors: Masayuki Murata, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 56 days.

(21) Appl. No.: 09/939,658

(22) Filed: Aug. 28, 2001

(65) Prior Publication Data

US 2002/0060860 A1 May 23, 2002

(30) Foreign Application Priority Data

Sep. 1, 2000 (JP) .................................... 2000-265256

(51) Int. Cl.[7] ............................................. G02B 13/04
(52) U.S. Cl. ...................................... 359/749; 359/754
(58) Field of Search ........................... 359/676, 680–83, 359/691, 692, 694, 708, 713–718, 749, 750, 751, 753–55

(56) References Cited

U.S. PATENT DOCUMENTS 5,764,421 A * 6/1998 Shimizu et al. ............. 359/689
5,805,359 A * 9/1998 Yamanashi .................. 359/753
5,991,093 A * 11/1999 Murata et al. .............. 359/691
2002/0034021 A1 * 3/2002 Murata et al. .............. 359/749

FOREIGN PATENT DOCUMENTS

JP  45-39875  12/1970

* cited by examiner

Primary Examiner—Jordan M. Schwartz
Assistant Examiner—Jessica Stultz
(74) Attorney, Agent, or Firm—Greenblum & Bernstein, P.L.C.

(57) ABSTRACT

A wide-angle lens system includes a negative first lens group, and a positive second lens group, in this order from the object. The second lens group includes a positive 2F sub-lens group and a positive 2R sub-lens, in this order from the object. Upon focusing from infinity to a closer object distance, an Fa lens group constituted by the first lens group and the positive 2F sub-lens group which are arranged to move integrally, and an Fb lens group constituted by the positive 2R sub-lens group are independently moved from the image side toward the object side so that the distance between the Fa lens group and the Fb lens group are made shorter. Furthermore, the a wide-angle lens system satisfies the following conditions:

$0.5 < H_1 / H_{2R} < 0.9$          (1)

$1.7 < n_{PAV}$          (2)

$0.5 < X_{an} / X_{bn} < 1.0$          (3)

7 Claims, 7 Drawing Sheets

Fig.1
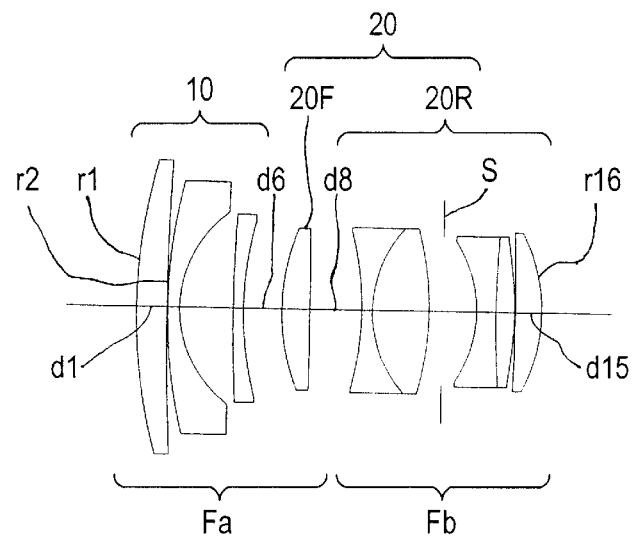
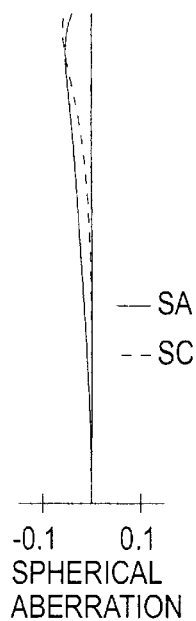
Fig.2A
FNO=1.8
— SA
-- SC
-0.1  0.1
SPHERICAL
ABERRATION
SINE CONDITION
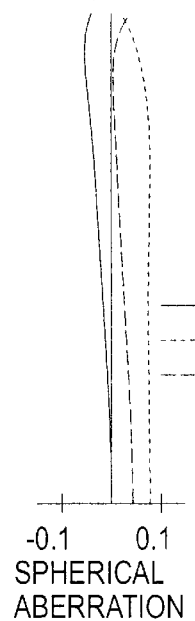
Fig.2B
FNO=1.8
— d Line
···· g Line
--- C Line
-0.1  0.1
SPHERICAL
ABERRATION
CHROMATIC
ABERRATION
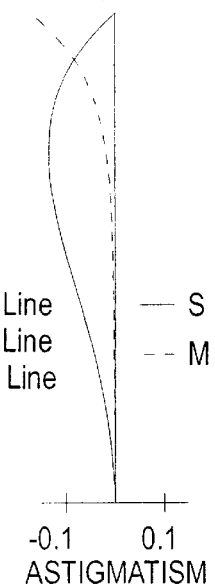
Fig.2C
W=35.3
— S
-- M
-0.1  0.1
ASTIGMATISM
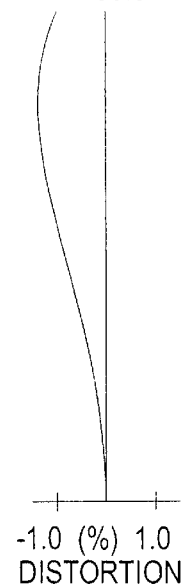
Fig.2D
W=35.3
-1.0 (%) 1.0
DISTORTION

FNO=1.9

-0.1  0.1
SPHERICAL
ABERRATION

SINE CONDITION

— SA
-- SC

FNO=1.9

-0.1  0.1
SPHERICAL
ABERRATION

CHROMATIC
ABERRATION

——— d Line
········ g Line
----- C Line

Y=21.6

-0.1  0.1
ASTIGMATISM

— S
-- M

Y=21.6

-1.0 (%) 1.0
DISTORTION

FNO=2.0

-0.1  0.1
SPHERICAL
ABERRATION

SINE CONDITION

— SA
-- SC

FNO=2.0

-0.1  0.1
SPHERICAL
ABERRATION

CHROMATIC
ABERRATION

——— d Line
········ g Line
----- C Line

Y=21.6

-0.1  0.1
ASTIGMATISM

— S
-- M

Y=21.6

-1.0 (%) 1.0
DISTORTION

FNO=1.8

—— SA
- - SC

-0.1    0.1
SPHERICAL
ABERRATION

SINE CONDITION

FNO=1.8

—— d Line
······ g Line
- - - C Line

-0.1    0.1
SPHERICAL
ABERRATION

CHROMATIC
ABERRATION

W=35.3

—— S
- - M

-0.1    0.1
ASTIGMATISM

W=35.3

-1.0 (%) 1.0
DISTORTION

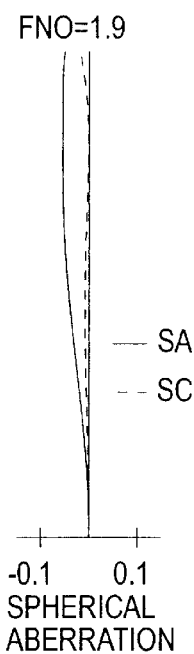
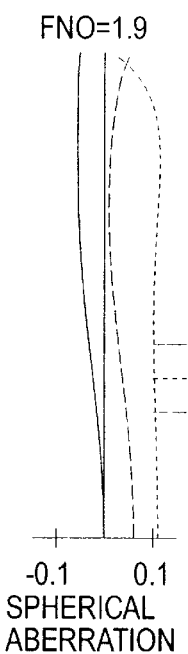
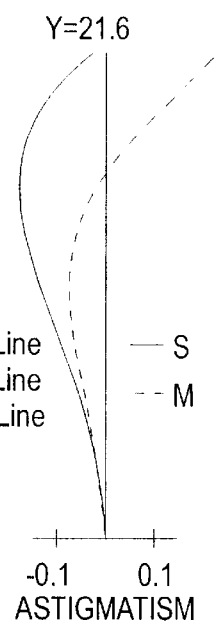
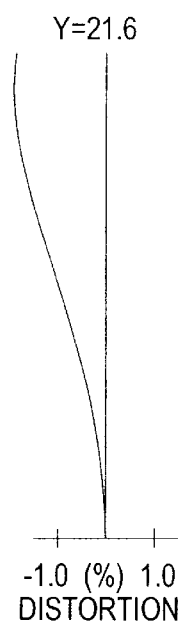
Fig.7A FNO=1.9 — SA --SC -0.1 0.1 SPHERICAL ABERRATION SINE CONDITION
Fig.7B FNO=1.9 — d Line ···· g Line --- C Line -0.1 0.1 SPHERICAL ABERRATION CHROMATIC ABERRATION
Fig.7C Y=21.6 — S --M -0.1 0.1 ASTIGMATISM
Fig.7D Y=21.6 -1.0 (%) 1.0 DISTORTION
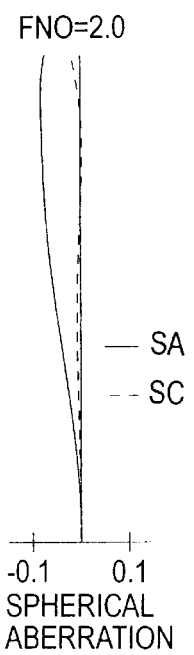
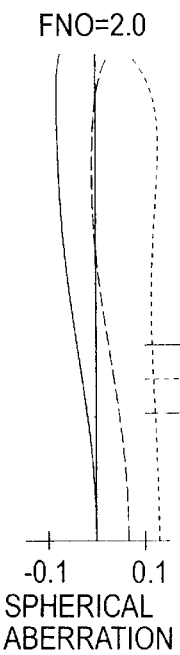
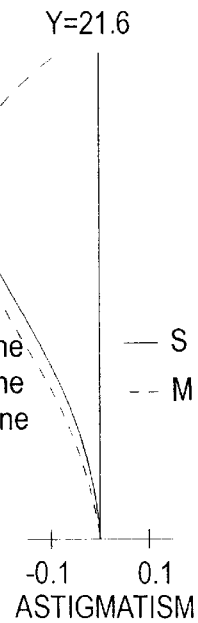
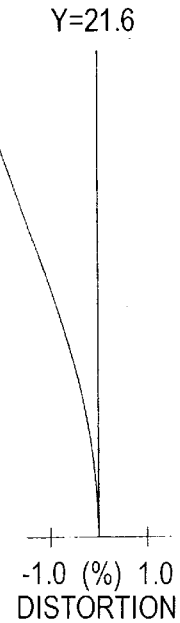
Fig.8A FNO=2.0 — SA --SC -0.1 0.1 SPHERICAL ABERRATION SINE CONDITION
Fig.8B FNO=2.0 — d Line ···· g Line --- C Line -0.1 0.1 SPHERICAL ABERRATION CHROMATIC ABERRATION
Fig.8C Y=21.6 — S --M -0.1 0.1 ASTIGMATISM
Fig.8D Y=21.6 -1.0 (%) 1.0 DISTORTION Fig.9
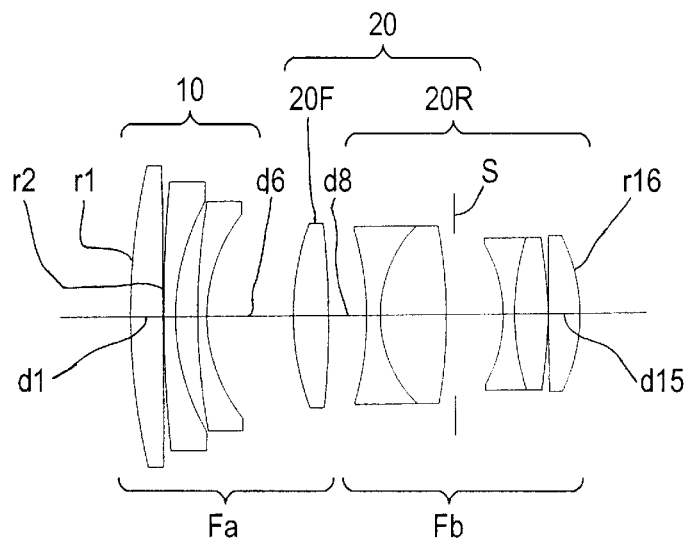
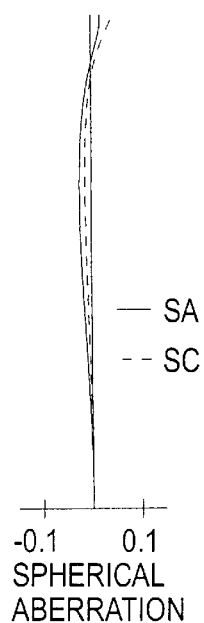
Fig.10A
FNO=1.8
— SA
-- SC
-0.1  0.1
SPHERICAL
ABERRATION
SINE CONDITION
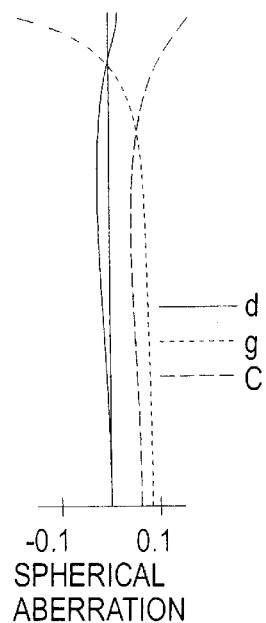
Fig.10B
FNO=1.8
— d Line
··· g Line
-- C Line
-0.1  0.1
SPHERICAL
ABERRATION
CHROMATIC
ABERRATION
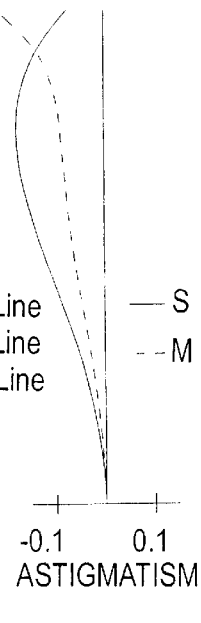
Fig.10C
W=34.8
— S
-- M
-0.1  0.1
ASTIGMATISM
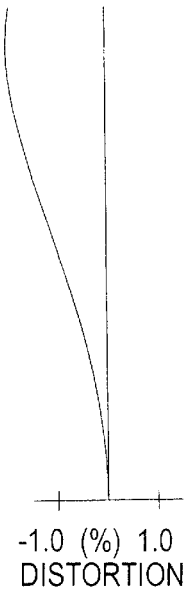
Fig.10D
W=34.8
-1.0 (%) 1.0
DISTORTION

FNO=1.9

-0.1  0.1
SPHERICAL
ABERRATION

SINE CONDITION

— SA
-- SC

FNO=1.9

-0.1  0.1
SPHERICAL
ABERRATION

CHROMATIC
ABERRATION

— d Line
······ g Line
---- C Line

Y=21.6

-0.1  0.1
ASTIGMATISM

— S
-- M

Y=21.6

-1.0 (%) 1.0
DISTORTION

FNO=2.1

-0.1  0.1
SPHERICAL
ABERRATION

SINE CONDITION

— SA
-- SC

FNO=2.1

-0.1  0.1
SPHERICAL
ABERRATION

CHROMATIC
ABERRATION

— d Line
······ g Line
---- C Line

Y=21.6

-0.1  0.1
ASTIGMATISM

— S
-- M

Y=21.6

-1.0 (%) 1.0
DISTORTION

WIDE-ANGLE LENS SYSTEM AND A FOCUSING METHOD THEREOF

BACKGROUND OF THE INVENTION

1. Field of the Invention

The present invention relates to a wide-angle lens system to be employed in a single lens reflex camera, and to a focusing method of the wide-angle lens system.

2. Description of the Prior Art

In a single reflex camera, a photographing lens system thereof needs to secure the back focal distance of a predetermined length, since a quick-return mirror is provided between the photographing lens system and the image-forming plane. Accordingly, in a wide-angle lens system, a retrofocus lens system in which the back focal distance is longer than the focal length has generally been employed. In such a retrofocus-type wide-angle lens system, particularly, in a wide-angle lens system in which all the lens groups are advanced upon focusing, image-forming performance at closer object distances becomes worse, because of large fluctuations in aberrations.

SUMMARY OF THE INVENTION

It is an object of the present invention to provide a wide-angle lens system which has (i) no substantial distance-dependent changes inaberrations, in particular, at closer distances, (ii) suitable image-forming performance with respect to an object at infinity toward an object at a closer distance, (iii) a large aperture (about F1.8 to F2.0), and (iv) a half-angle-of-view of about 35°; and to provide a focusing method for the wide-angle lens system.

In order to achieve the above-mentioned object, there is provided a wide-angle lens system including a negative first lens group and a positive second lens group, in this order from the object. The second lens group includes a positive 2F sub-lens group (front sub-lens group) and a positive 2R sub-lens group (rear sub-lens group), in this order from the object. Upon focusing on an object at infinity toward an object at a closer distance (i.e., focusing from an infinite object distance to a closer object distance), an Fa lens group (first focusing lens group) constituted by the first lens group and the positive 2F sub-lens group (front sub-lens group) which are arranged to move integrally, and an Fb lens group (second focusing lens group) constituted by the positive 2R sub-lens group (rear sub-lens group) are independently moved from the image side toward the object side so that the distance between the Fa lens group (first focusing lens group) and the Fb lens group (second focusing lens group) are made shorter. Furthermore, the wide-angle lens system satisfies the following conditions:

$$0.5 < H_1/H_{2R} < 0.9 \quad (1)$$

$$1.7 < n_{PAV} \quad (2)$$

$$0.5 < X_{an}/X_{bn} < 1.0 \quad (3)$$

wherein $H_1$ designates the radius of a bundle of axial light rays on the most object-side surface of the first lens group, when an object at an infinite photographing distance is in an in-focus state;

$H_{2R}$ designates the radius of a bundle of axial light rays on the most object-side surface of the positive 2R sub-lens group (rear sub-lens group) of the second lens group, when an object at an infinite photographing distance is in an in-focus state;

$n_{PAV}$ designates the averaged refractive indexes of the d-line with respect to positive lens elements in the positive second lens group;

$X_{an}$ designates a distance along which the Fa lens group (first focusing lens group) is advanced, the distance of which is defined by the position of the Fa lens group (first focusing lens group) corresponding to an infinite photographing distance and the position thereof corresponding to the shortest photographing distance; and $X_{bn}$ designates a distance along which the Fb lens group (second focusing lens group) is advanced, the distance of which is defined by the position of the Fb lens group (second focusing lens group) corresponding to an infinite photographing distance and the position thereof corresponding to the shortest photographing distance.

According to a focusing method for the wide-angle lens system, (i) the wide-angle lens system is constituted by a retrofocus-type lens system including a negative first lens group and a positive second lens group, in this order from the object, (ii) the positive second lens group includes a positive 2F sub-lens group (front sub-lens group) and a positive 2R sub-lens group (rear sub-lens group), in this order from the object, and (iii) the wide-angle lens system satisfies the above conditions (1) and (2); and the method includes the following steps:

providing an Fa lens group (first focusing lens group) constituted by the first lens group and the positive 2F sub-lens group (front sub-lens group) so that these lens groups are integrally moved;

providing an Fb lens group (second focusing lens group) constituted by the positive 2R sub-lens group (rear sub-lens group); and in order to satisfy the above condition (3) upon focusing on an object at infinity toward an object at a closer distance, moving the Fa lens group (first focusing lens group) and the Fb lens group (second focusing lens group) independently from the image side toward the object side so that the distance between the Fa lens group (first focusing lens group) and the Fb lens groups (second focusing lens group) are made shorter.

Condition (3) specifies the ratio of the traveling distance of the Fa lens group (first focusing lens group) to that of the Fb lens group (second focusing lens group) with respect to an in-focus state of an object at infinity and an in-focus sate of an object at the shortest photographing distance. Between the above two in-focus states at infinity and the shortest photographing distance, focusing operation can be carried out either by varying the ratio of the traveling distance of the Fa lens group (first focusing lens group) to that of the Fb lens group (second focusing lens group) when an in-focus state at infinity is changed to an in-focus state of an object at an arbitrary distance, or by setting a substantially constant ratio thereof. The former is known as a non-linear focusing method, and the latter is known as a linear focusing method. In the case of the non-linear focusing method, the Fa lens group (first focusing lens group) and the Fb lens group (second focusing lens group) preferably satisfy the following conditions:

$$0.5 < X_{an}/X_{bn} < \Delta X_{ai}/\Delta X_{bi} < 1.0 \quad (4)$$

$$-0.1 < \beta < 0 \quad (5)$$

wherein $\Delta X_{ai}$ designates the slope of a tangent at a point, corresponding to an infinite photographing distance, on the moving path of the Fa lens group (first focusing lens group);

$\Delta X_{bi}$ designates the slope of a tangent at a point, corresponding to an infinite photographing distance, on the moving path of the moving path of the Fb lens group (second focusing lens group);

$X_1 = \alpha X_2 + \beta X_2^2$;

$X_1$ designates a distance along which the Fa lens group (first focusing lens group) is advanced, the distance of which corresponds to a photographing distance between the infinite photographing distance and the shortest photographing distance;

$X_2$ designates a distance along which the Fb lens group (second focusing lens group) is advanced, the distance of which corresponds to a photographing distance between an infinite photographing distance and the shortest photographing distance;

$\alpha$ designates a first coefficient; and $\beta$ designates a second coefficient.

In the wide-angle lens system according to the present invention, at lease one aspherical surface is preferably provided in the second lens group. More preferably, the aspherical surface is provided in the positive 2R sub-lens group (rear sub-lens group), and satisfies the following condition:

$$0.2 < \Delta V < 0 \quad (6)$$

wherein $\Delta V$ designates an aspherical-surface term in an aberration coefficient.

The wide-angle lens system of the present invention can satisfy the following condition:

$$|f/f_{Fa}| < 0.25 \quad (7)$$

wherein f designates the focal length of the entire lens system; and $f_{Fa}$ designates the focal length of the Fa lens group (first focusing lens group).

The present disclosure relates to subject matter contained in Japanese Patent Applications No. 2000-265256 (filed on Sep. 1, 2000) which is expressly incorporated herein in its entirety.

BRIEF DESCRIPTION OF THE DRAWINGS

The invention will be discussed below in detail with reference to the accompanying drawings, in which:

FIG. 1 shows a lens arrangement of the wide-angle lens system according to a first embodiment of the present invention;

FIGS. 2A, 2B, 2C and 2D show aberrations occurred in the lens arrangement shown in FIG. 1, when an object at an infinite photographing distance is in an in-focus state;

FIGS. 7A, 7B, 7C and 7D show aberrations occurred in the lens arrangement shown in FIG. 5, when an object at a finite photographing distance (magnification: −0.07) is in an in-focus state;

FIGS. 8A, 8B, 8C and 8D show aberrations occurred in the lens arrangement shown in FIG. 5, when an object at the shortest photographing distance is in an in-focus state;

FIG. 9 shows a lens arrangement of the wide-angle lens system according to a third embodiment of the present invention;

FIGS. 10A, 10B, 10C and 10D show aberrations occurred in the lens arrangement shown in FIG. 9, when an object at an infinite photographing distance is in an in-focus state;

DESCRIPTION OF THE PREFERRED EMBODIMENTS

Figure 13:
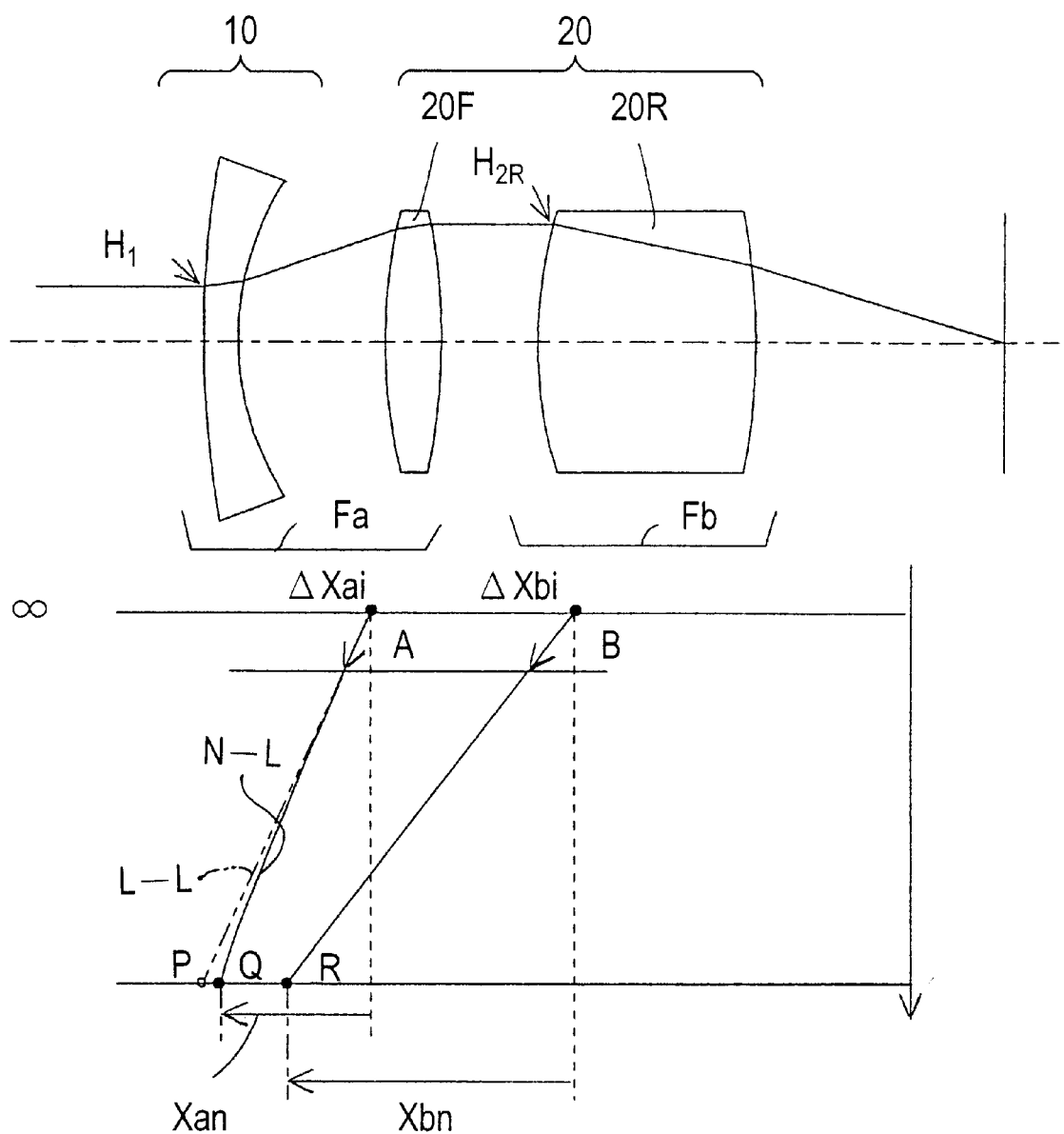
FIG. 13 shows the focusing operation of the wide-angle lens system of the present invention.

The lens system shown in FIG. 13 is a retrofocus-type wide-angle lens system, which includes a negative first lens group 10, and a positive second lens group 20, in this order from the object. The second lens group 20 includes a positive 20F (2F) sub-lens group (front sub-lens group) and a positive 20R (2R) sub-lens group (rear sub-lens group), in this order from the object. Upon focusing on an object at infinity toward an object at a closer distance, an Fa lens group (first focusing lens group) constituted by the first lens group 10 and the positive sub-lens group 20F which are arranged to move integrally, and an Fb lens group (second focusing lens group) constituted by the positive sub-lens group 20R are independently moved from the image side toward the object side so that the distance between the Fa lens group and the Fb lens group are made shorter. According to FIG. 13, there are at least two types of focusing operations. One is to move both the Fa lens group and the Fb lens group linearly (refer to the line L—L in FIG. 13). The other, which is more preferable, is to move the Fa lens group and the Fb lens group non linearly (refer to the line N-L in FIG. 13).

Figure 3A:
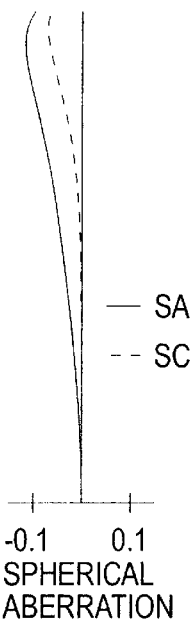
FIGS. 3A, 3B, 3C and 3D show aberrations occurred in the lens arrangement shown in FIG. 1, when an object at a finite photographing distance (magnification: −0.07) is in an in-focus state.
Figure 3B:
Figure 3C:
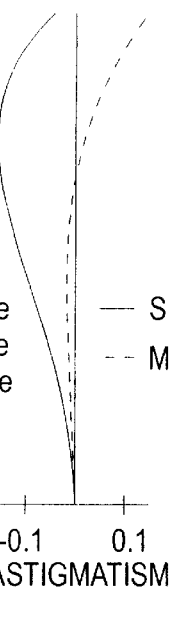
Figure 3D:
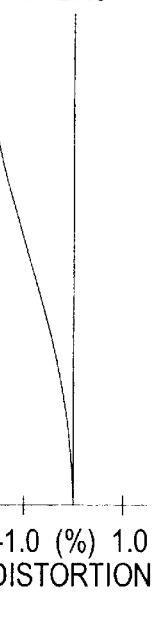
Figure 4A:
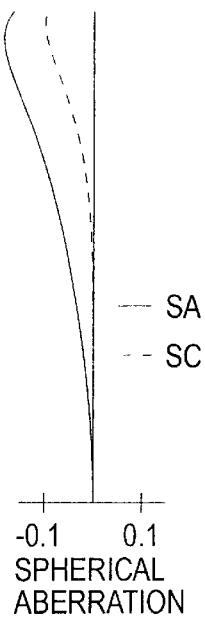
FIGS. 4A, 4B, 4C and 4D show aberrations occurred in the lens arrangement shown in FIG. 1, when an object at the shortest photographing distance is in an in-focus state.
Figure 4B:
Figure 4C:
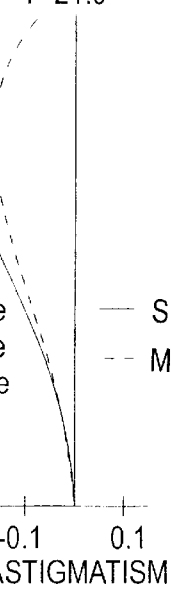
Figure 4D:
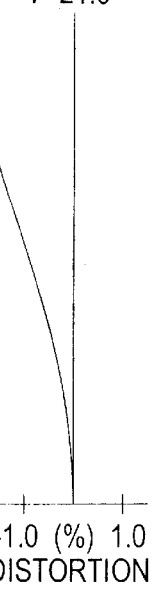
Figure 5:
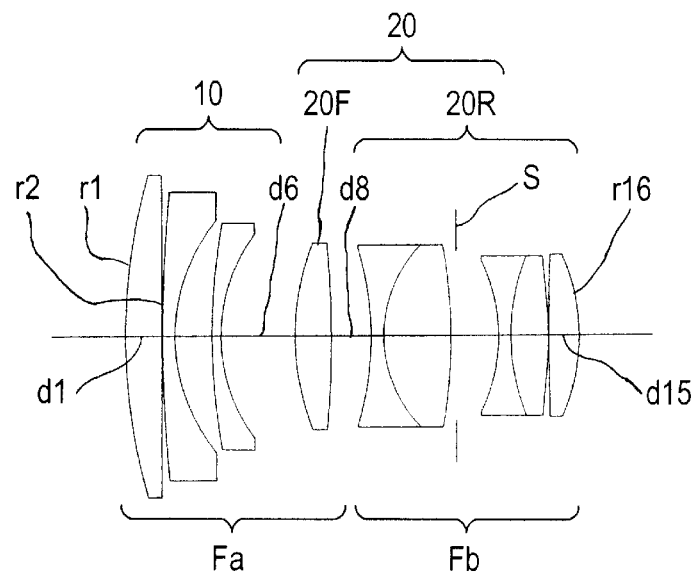
FIG. 5 shows a lens arrangement of the wide-angle lens system according to a second embodiment of the present invention.
Figure 6A:
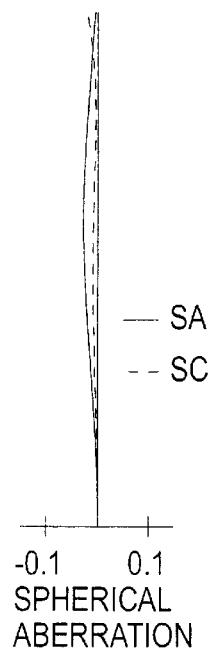
FIGS. 6A, 6B, 6C and 6D show aberrations occurred in the lens arrangement shown in FIG. 5, when an object at an infinite photographing distance is in an in-focus state.
Figure 6B:
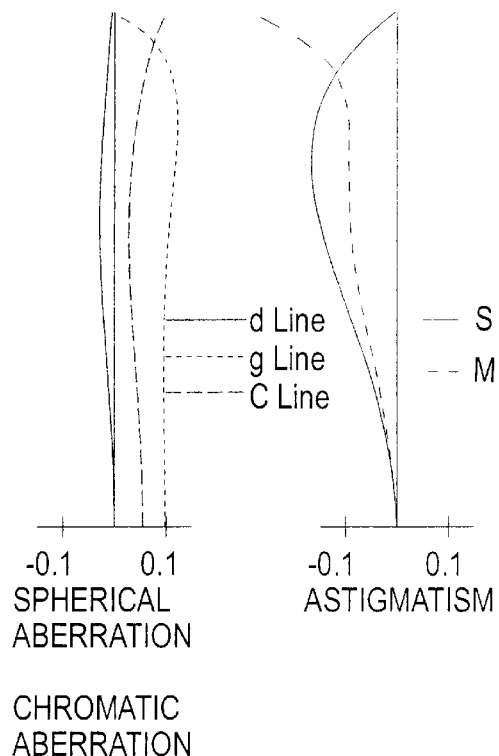
Figure 6C:
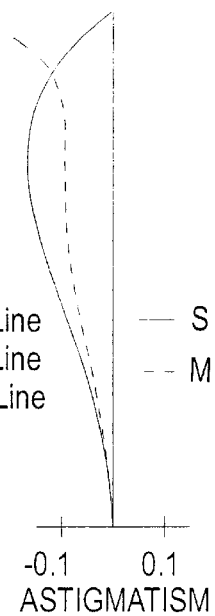
Figure 6D:
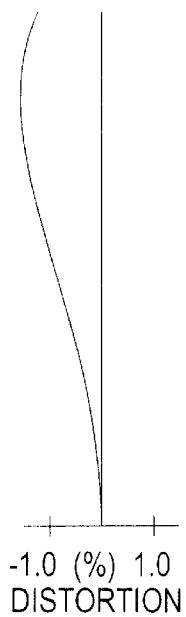
Figure 11A:
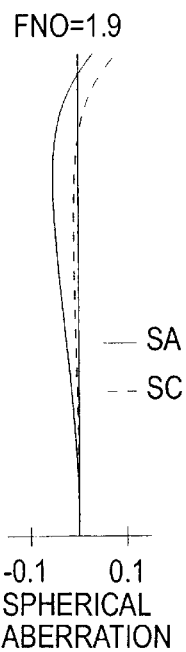
FIGS. 11A, 11B, 11C and 11D show aberrations occurred in the lens arrangement shown in FIG. 9, when an object at a finite photographing distance (magnification: −0.07) is in an in-focus state.
Figure 11B:
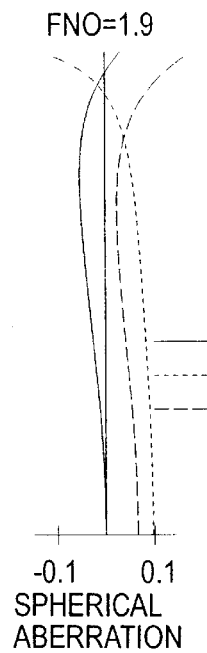
Figure 11C:
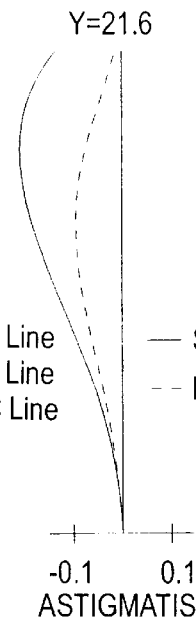
Figure 11D:
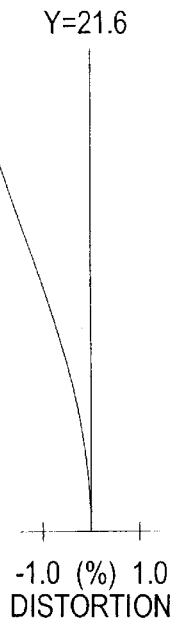
Figure 12A:
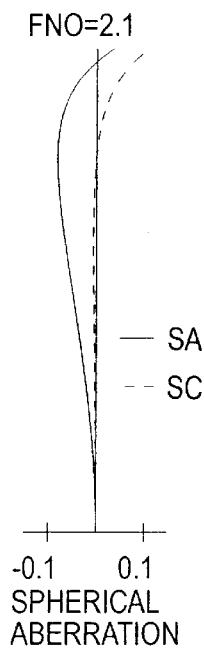
FIGS. 12A, 12B, 12C and 12D show aberrations occurred in the lens arrangement shown in FIG. 9, when an object at the shortest photographing distance is in an in-focus state.
Figure 12B:
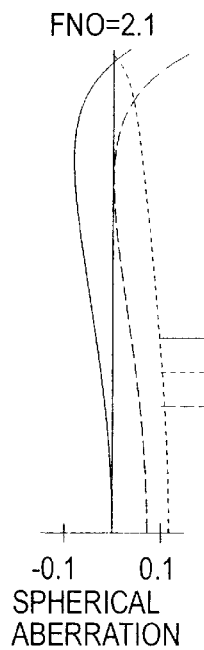
Figure 12C:
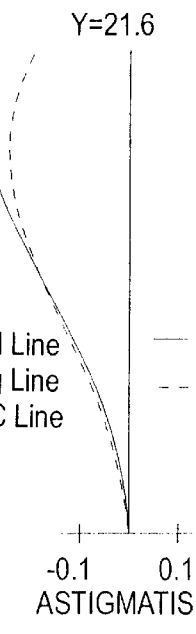
Figure 12D:
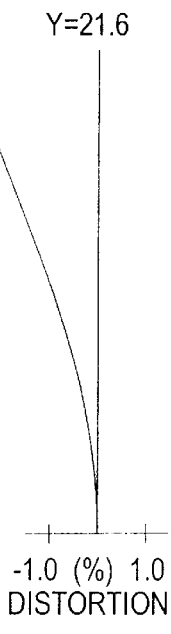

As shown in FIGS. 1, 5 and 9, the negative first lens group 10 includes a positive lens element, and two negative lens elements, in this order from the object; and the second lens group 20 includes the positive sub-lens group 20F constituted by a positive lens element, and the positive sub-lens group 20R constituted by two cemented sub-lens groups each of which is constituted by a negative lens element and a positive lens element, and a positive lens element, in this order from the object. A diaphragm S is provided between the two cemented sub-lens groups in the positive sub-lens group 20R.

Condition (1) specifies the height of axial-upper light rays, and that the lens system is a retrofocus-type lens system. Symbols $H_1$ and $H_{2R}$ indicating the heights of an axial-upper light ray are shown in FIG. 13.

If $H_1/H_{2R}$ exceeds the upper limit of condition (1), it becomes difficult to make the back focal distance longer, or becomes difficult to make an angle-of-view wider.

If $H_1/H_{2R}$ exceeds the lower limit of condition (1), the back focal distance becomes unnecessarily longer, which is disadvantageous for miniaturization of the lens system. Furthermore, negative distortion is increased.

Condition (2) specifies the averaged refractive indexes of the d-line with respect to the positive lens elements in the positive second lens group 20.

If $n_{PAV}$ exceeds the lower limit of condition (2), the curvature of a lens surface in order to obtain necessary power becomes lager, so that aberrations of higher order becomes more noticeable. As a result, it is difficult to make the aperture larger (F-number of 1.8 to 2.0).

Condition (3) specifies the ratio of the advancing distance, upon focusing, of the first lens group 10 and the positive sub-lens group 20F (i.e., the Fa lens group) to that of the positive sub-lens group 20R (i.e., the Fb lens group), under the condition that these lens groups are linearly moved.

If $X_{an}/X_{bn}$ exceeds the upper limit of condition (3), fluctuations in aberrations, upon focusing on an object at infinity toward an object at a closer distance, become larger, compared with the case where the entire lens system is advanced.

If $X_{an}/X_{bn}$ exceeds the lower limit of condition (3), fluctuations in aberrations, upon focusing on an object at infinity to an object at a closer distance, are extremely reduced, so that fluctuations in aberrations opposite to the case where $X_{an}/X_{bn}$ exceeds the upper limit of condition (3) occur.

Condition (4) specifies the ratio of the advancing distance, upon focusing, of the first lens group 10 and the positive sub-lens group 20F (i.e., the Fa lens group) to that of the positive sub-lens group 20R (i.e., the Fb lens group), under the condition that these lens groups are non-linearly moved.

If $X_{an}/X_{bn} < \Delta X_{ai}/\Delta X_{bi}$ exceeds the upper limit of condition (4), fluctuations in aberrations, upon focusing on an object at infinity toward an object at a closer distance, become larger, compared with the case where the entire lens system is advanced.

If $X_{an}/X_{bn} < \Delta X_{ai}/\Delta X_{bi}$ exceeds the lower limit of condition (4), fluctuations in aberrations, upon focusing on an object at infinity to an object at a closer distance, are extremely reduced, so that fluctuations in aberrations opposite to the case where $X_{an}/X_{bn} < \Delta X_{ai}/\Delta X_{bi}$ exceeds the upper limit of condition (4) occur.

In condition (4), $X_1$ is simply defined as a quadratic function of $X_2$, in which α designates a first coefficient, and β designates a second coefficient. Similar movement (of lens groups) can be defined by a cubic polynominal; however, lens groups substantially follow the moving paths defined by a quadratic function.

Condition (5) specifies the second coefficient β under the condition that the first lens group 10 and the positive sub-lens group 20F (i.e., the Fa lens group), and the positive sub-lens group 20R (i.e., the Fb lens group) are non-linearly moved upon focusing. By satisfying this condition, a focusing operation which can maintain a suitable balance on image-forming performance at infinity and a closer distance can be achieved.

If β exceeds the upper limit of condition (5), the distance between the positive sub-lens group 20F and the positive sub-lens group 20R becomes longer, compared with the case where these lens groups are linearly moved when focusing is carried out on an object at a closer distance. As a result, fluctuations in aberrations becomes a lot more larger.

If β exceeds the lower limit of condition (5), fluctuations in aberrations are extremely reduced, so that balance on image-forming performance at infinity and a closer distance is lost.

Condition (6) directly specifies an aspherical-surface term in a distortion coefficient with respect to an aspherical surface, in the case where at lease one aspherical surface is provided in the second lens group 20.

If ΔV exceeds the upper limit of condition (6), distortion is undercorrected.

If ΔV exceeds the lower limit of condition (6), distortion is overcorrected, so that the amount of distortion which occurs, in the positive direction, from an intermediate image height position over the most outer-peripheral area becomes larger.

Condition (7) specifies the combined power of the first lens group 10 and the positive sub-lens group 20F, i.e., the power of the Fa lens group.

If $|f/f_{Fa}|$ exceeds the upper limit of condition (7), fluctuations in aberrations, upon focusing on an object at infinity to an object at a closer distance, become larger.

Specific numerical data of the embodiments will be described hereinafter. In the figures showing spherical aberration and the sine condition, SA designates spherical aberration, SC designates the sine condition. In the figures showing chromatic aberration represented by spherical aberration, the solid line and the two types of dotted lines respectively indicate spherical aberrations with respect to the d, g and C lines. In the figures showing astigmatism, S designates the sagittal image, M designates the meridional image, and Y designates the image height. In the figures showing distortion, Y designates the image height. In the tables, Fno designates the F-number, m designates the transverse magnification, f designates the focal length of the entire zoom lens system, u designates an object distance(m), W designates the half angle-of-view (°), $f_B$ designates the back focal distance, r designates the radius of curvature, d designates the lens-element thickness or distance between lens elements, Nd designates the refractive index of the d-line, and υ designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10} \ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

The relation between the aspherical coefficients and the aberration coefficients will be herein discussed.

1. The shape of an aspherical surface is defined as follows:

$$x = cy^2/(1+[1-\{1+K\}c^2y^2]^{1/2}) + A4y^4 + A6y^6 + A8y^8 + A10y^{10} \ldots$$

wherein:

x designates a distance from a tangent plane of an aspherical vertex;

y designates a distance from the optical axis;

c designates a curvature of the aspherical vertex (1/r),

K designates a conic constant;

2. In this equation, to obtain the aberration coefficients, the following substitution is made to replace K with "0" (Bi=Ai when K=0).

$B4 = A4 + Kc^3/8;$ $B6 = A6 + (K^2 + 2K)c^5/16;$ $B8 = A8 + 5(K^3 + 3K^2 + 3K)c^7/128$ $B10 = A10 + 7(K^4 + 4K^3 + 6K^2 + 4K)c^9/256;$ and therefore, the following equation is obtained:

$$x = cy^2/[1+[1-c^2y^2]^{1/2}] + B4y^4 + B6y^6 + B8y^8 + B10y^{10} + \ldots$$

3. Furthermore, in order to normalize the focal length f to 1.0, the followings are considered:

$$X = x/f;\ Y = y/f;\ C = f*c;$$

$$\alpha 4 = f^3 B4;\ \alpha 6 = f^5 B6;\ \alpha 8 = f^7 B8;\ \alpha 10 = f^9 B10$$

Accordingly, the following equation is obtained.

$$X = CY^2/[1+[1-C^2Y^2]^{1/2}] + \alpha 4 Y^4 + \alpha 6 Y^6 + \alpha 8 Y^8 + \alpha 10 Y^{10} + \ldots$$

4. $\Phi = 8(N'-N)\alpha 4$ is defined, and the third aberration coefficients are defined as follows:

I designates the spherical aberration coefficient;

II designates the coma coefficient;

III designates the astigmatism coefficient;

IV designates the curvature coefficient of the sagittal image surface; and

V designates a distortion coefficient; and therefore, the influence of the fourth-order aspherical-surface coefficient ($\alpha 4$) on each aberration coefficient is defined as:

$\Delta I = h^4 \Phi$ $\Delta II = h^3 k \Phi$ $\Delta III = h^2 k^2 \Phi$ $\Delta IV = h^2 k^2 \Phi$ $\Delta V = h k^3 \Phi$ wherein h1 designates the height at which a paraxial axial light ray strikes the first surface of the lens system including the aspherical surface;

h designates the height at which the paraxial axial light ray strikes the aspherical surface when the height hi is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

[First Embodiment]

FIG. 1 shows a lens arrangement of the wide-angle lens system according to the first embodiment. FIGS. 2A through 2D show aberrations occurred in the lens arrangement shown in FIG. 1, when an object at an infinite photographing distance is in an in-focus state. FIGS. 3A through 3D show aberrations occurred in the lens arrangement shown in FIG. 1, when an object at a finite photographing distance (magnification: −0.07) is in an in-focus state. FIGS. 4A through 4D show aberrations occurred in the lens arrangement shown in FIG. 1, when an object at the shortest photographing distance (object distance: about 10f) is in an in-focus state. Table 1 shows the numerical data of the first embodiment. The negative first lens group 10 includes a positive lens element, and two negative meniscus lens elements, in this order from the object. The second lens group 20 includes the positive sub-lens group 20F constituted by a positive lens element, and the positive sub-lens group 20R constituted by two cemented sub-lens groups each of which is constituted by a negative lens element and a positive lens element, and a positive lens element, in this order from the object. The diaphragm S is provided between the two cemented sub-lens groups in the positive sub-lens group 20R. In the first embodiment, a focusing operation on an object at infinity toward an object at a closer distance, is performed by non-linearly moving the Fa lens group and the Fb lens group along the solid lines shown in the lower half of FIG. 13.

TABLE 1

$F_{NO} = 1:1.8$
$f = 30.90$
$m = 0.000$--$-0.070$--$-0.148$
$f_B = 36.90$-$39.07$-$41.47$
$u = \infty$-$-0.53$-$0.30$
$W = 35.3$

| Surface No. | r | d | Nd | ν |
|---|---|---|---|---|
| 1 | 78.108 | 4.38 | 1.77250 | 49.6 |
| 2 | 358.792 | 0.10 | — | — |
| 3 | 76.705 | 1.67 | 1.67003 | 47.3 |
| 4 | 17.423 | 7.64 | — | — |
| 5 | 221.262 | 1.50 | 1.61800 | 63.4 |
| 6 | 48.445 | 5.56 | — | — |
| 7 | 31.497 | 3.99 | 1.83400 | 37.2 |
| 8 | −927.714 | 7.52-6.93-6.15 | — | — |
| 9 | −43.702 | 1.50 | 1.60880 | 36.7 |
| 10 | 18.000 | 8.10 | 1.81000 | 47.3 |
| 11 | −44.430 | 1.92 | — | — |
| Diaphragm | ∞ | 4.85 | — | — |
| 12 | −19.000 | 2.79 | 1.73400 | 27.7 |
| 13 | 152.020 | 2.65 | 1.69350 | 53.2 |
| 14* | −46.535 | 0.10 | — | — |
| 15 | −287.024 | 3.84 | 1.77250 | 49.6 |
| 16 | −24.575 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 14 | 0.00 | $0.2118 \times 10^{-4}$ | $0.2272 \times 10^{-7}$ | $-0.2000 \times 10^{-10}$ |

[Embodiment 2]

FIG. 5 shows a lens arrangement of the wide-angle lens system according to the second embodiment. FIGS. 6A through 6D show aberrations occurred in the lens arrangement shown in FIG. 5, when an object at an infinite photographing distance is in an in-focus state. FIGS. 7A through 7D show aberrations occurred in the lens arrangement shown in FIG. 5, when an object at a finite photographing distance (magnification: −0.07) is in an in-focus state. FIGS. 8A through 8D show aberrations occurred in the lens arrangement shown in FIG. 5, when an object at the shortest photographing distance (object distance: about 10f) is in an in-focus state. Table 2 shows the numerical data of the second embodiment. The basic lens arrangement and focusing operation are the same as the first embodiment.

TABLE 2

$F_{NO} = 1:1.8$
$f = 30.90$
$m = 0.000\text{--}0.070\text{--}0.149$
$f_B = 37.13\text{-}39.31\text{-}41.77$
$u = \infty\text{-}0.53\text{-}0.30$
$W = 35.3$

| Surface No. | r | d | Nd | ν |
|---|---|---|---|---|
| 1 | 78.098 | 4.98 | 1.72916 | 54.7 |
| 2 | 6866.103 | 0.10 | — | — |
| 3 | 198.610 | 1.67 | 1.68893 | 31.1 |
| 4 | 25.334 | 5.03 | — | — |
| 5 | 86.361 | 1.20 | 1.61800 | 63.4 |
| 6 | 23.386 | 10.13 | — | — |
| 7 | 34.941 | 5.00 | 1.80100 | 35.0 |
| 8 | −131.560 | 5.41-4.87-3.88 | — | — |
| 9 | −41.702 | 1.70 | 1.51742 | 52.4 |
| 10 | 17.768 | 9.20 | 1.80400 | 46.6 |
| 11 | −73.924 | 0.70 | — | — |
| Diaphragm | ∞ | 5.79 | — | — |
| 12 | −23.632 | 1.69 | 1.84666 | 23.8 |
| 13 | 29.795 | 5.06 | 1.72750 | 40.3 |
| 14* | −54.008 | 0.10 | — | — |
| 15 | 523.668 | 4.10 | 1.77250 | 49.6 |
| 16 | −27.472 | — | — | — |

*designates the aspherical surface which is rotationally symmetrical with respect to the optical axis.
Aspherical surface data (the aspherical surface coefficients not indicated are zero (0.00)):

| Surf No. | K | A4 | A6 | A8 |
|---|---|---|---|---|
| 14 | 0.00 | $0.1985 \times 10^{-4}$ | $0.3239 \times 10^{-7}$ | $0.4715 \times 10^{-11}$ |

[Embodiment 3]

FIG. 9 shows a lens arrangement of the wide-angle lens system according to a third embodiment. FIGS. 10A through 10D show aberrations occurred in the lens arrangement shown in FIG. 9, when an object at an infinite photographing distance is in an in-focus state. FIGS. 11A through 11D show aberrations occurred in the lens arrangement shown in FIG. 9, when an object at a finite photographing distance (magnification: −0.07) is in an in-focus state. FIGS. 12A through 12D show aberrations occurred in the lens arrangement shown in FIG. 9, when an object at the shortest photographing distance (object distance: about 10f) is in an in-focus state. Table 3 shows the numerical data of the third embodiment. The basic lens arrangement and focusing operation are the same as the first embodiment.

TABLE 3

$F_{NO} = 1:1.8$
$f = 31.80$
$m = 0.000\text{--}0.070\text{--}0.155$
$f_B = 36.90\text{-}39.15\text{-}41.88$
$u = \infty\text{-}0.53\text{-}0.30$
$W = 34.8$

| Surface No. | r | d | Nd | ν |
|---|---|---|---|---|
| 1 | 95.700 | 4.68 | 1.72916 | 54.7 |
| 2 | −5402.519 | 0.10 | — | — |
| 3 | 195.220 | 1.67 | 1.76182 | 26.5 |
| 4 | 33.385 | 3.13 | — | — |
| 5 | 93.000 | 1.30 | 1.61800 | 63.4 |
| 6 | 23.440 | 12.29 | — | — |
| 7 | 38.680 | 5.00 | 1.80100 | 35.0 |
| 8 | −126.230 | 5.46-4.77-3.87 | — | — |
| 9 | −43.081 | 1.90 | 1.51742 | 52.4 |
| 10 | 18.044 | 9.39 | 1.80400 | 46.6 |
| 11 | −72.460 | 1.20 | — | — |

TABLE 3-continued

| | | | | |
|---|---|---|---|---|
| Diaphragm | ∞ | 6.86 | — | — |
| 12 | −20.415 | 1.60 | 1.84666 | 23.8 |
| 13 | 36.650 | 4.74 | 1.72750 | 40.3 |
| 14* | −48.519 | 0.10 | — | — |
| 15 | 1937.471 | 4.42 | 1.77250 | 49.6 |
| 16 | −25.427 | — | — | — |

*designates the aspherical surface which is rotationally symmetrical with respect to the optical axis.
Aspherical surface data (the aspherical surface coefficients not indicated are zero (0.00)):

| Surf No. | K | A4 | A6 | A8 |
|---|---|---|---|---|
| 14 | 0.00 | $0.1983 \times 10^{-4}$ | $0.2547 \times 10^{-7}$ | $0.9113 \times 10^{-12}$ |

The numerical values of each condition of each embodiment are shown in the following Table 4.

TABLE 4

| | Embod. 1 | Embod. 2 | Embod. 3 |
|---|---|---|---|
| Cond. (1) | 0.733 | 0.697 | 0.701 |
| Cond. (2) | 1.7775 | 1.7763 | 1.7763 |
| Cond. (3) | 0.70 | 0.67 | 0.68 |
| Cond. (4) ($\Delta X_{ai}/\Delta X_{bi} = \alpha$) | 0.75 | 0.80 | 0.70 |
| Cond. (4) ($X_{an}/X_{bn}$) | 0.70 | 0.67 | 0.68 |
| Cond. (5) | −0.013 | −0.032 | −0.005 |
| Cond. (6) | −0.047 | −0.078 | −0.103 |
| Cond. (7) | 0.122 | 0.197 | 0.221 |

As can be understood from Table 4, each embodiment satisfies each condition. Furthermore, as can be understood from the aberration diagrams, aberrations can be adequately corrected.

According to the above description, a wide-angle lens system which has (i) no substantial distance-dependent changes in aberrations, in particular, at closer distances, (ii) suitable image-forming performance with respect to an object at infinity to an object at a closer distance, (iii) a large aperture (about F1.8 to F2.0), and (iv) a half angle-of-view of about 35° can be obtained; and a focusing method for the wide-angle lens system can be obtained.

What is claimed is:

1. A wide-angle lens system comprising a negative first lens group, and a positive second lens group, in this order from an object, wherein said positive second lens group comprises a positive front sub-lens group and a positive rear sub-lens group, in this order from said object;

wherein upon focusing from an infinite object distance to a closer object distance, a first focusing lens group comprising said first lens group and said positive front sub-lens group which are arranged to move integrally, and a second focusing lens group comprising said positive rear sub-lens group are independently moved from the image side toward the object side so that the distance between said first focusing lens group and said second focusing lens group are made shorter; and wherein said wide-angle lens system satisfies the following conditions:

$0.5 < H_1/H_{2R} < 0.9$ $1.7 < n_{PAV}$ $0.5 < X_{an}/X_{bn} < 1.0$ wherein
- $H_1$ designates the radius of a bundle of axial light rays on the most object-side surface of said first lens group, when said object at an infinite photographing distance is in an in-focus state;
- $H_{2R}$ designates the radius of a bundle of axial light rays on the most object-side surface of said rear sub-lens group of said second lens group, when said object at an infinite photographing distance is in an in-focus state;
- $n_{PAV}$ designates the averaged refractive indexes of the d-line with respect to positive lens elements in said second lens group;
- $X_{an}$ designates a distance along which said first focusing lens group is advanced, the distance of which is defined by the position of said first focusing lens group corresponding to an infinite photographing distance and the position thereof corresponding to the shortest photographing distance; and
- $X_{bn}$ designates a distance along which said second focusing lens group is advanced, the distance of which is defined by the position of said second focusing lens group corresponding to an infinite photographing distance and the position thereof corresponding to the shortest photographing distance.

2. The wide-angle lens system according to claim 1, further satisfying the following conditions:

$$0.5 < X_{an}/X_{bn} < \Delta X_{ai}/\Delta X_{bi} < 1.0 - 0.1 < \beta < 0$$

wherein
- $\Delta X_{ai}$ designates the slope of a tangent at a point, corresponding to an infinite photographing distance, on the moving path of said first focusing lens group;
- $\Delta X_{bi}$ designates the slope of a tangent at a point, corresponding to an infinite photographing distance, on the moving path of said second focusing lens group;

$$X_1 = \alpha X_2 + \beta X_2^2$$

- $X_1$ designates a distance along which said first focusing lens group is advanced, the distance of which corresponds to a photographing distance between an infinite photographing distance and the shortest photographing distance;
- $X_2$ designates a distance along which said second focusing lens group is advanced, the distance of which corresponds to a photographing distance between an infinite photographing distance and the shortest photographing distance;
- $\alpha$ designates a first coefficient; and
- $\beta$ designates a second coefficient.

3. The wide-angle lens system according to claim 1, wherein said second lens group comprises at least one aspherical surface.

4. The wide-angle lens system according to claim 3, wherein said aspherical surface is provided in said positive rear sub-lens group, and wherein said aspherical surface satisfies the following condition:

$$-0.2 < \Delta V < 0$$

wherein
- $\Delta V$ designates an aspherical-surface term in an aberration coefficient.

5. The wide-angle lens system according to claim 1, satisfying the following condition:

$$|f/f_{Fa}| < 0.25$$

wherein
- f designates the focal length of the entire lens system; and
- $f_{Fa}$ designates the focal length of said first focusing lens group.

6. A focusing method for a wide-angle lens system comprising a negative first lens group and a positive second lens group, in this order from an object,
- wherein said positive second lens group comprises a positive front sub-lens group and a positive rear sub-lens group, in this order from said object; and
- wherein said wide-angle lens system satisfies the following conditions:

$$0.5 < H_1/H_{2R} < 0.9$$
$$1.7 < n_{PAV};$$

wherein said method comprises the following steps:
- providing a first focusing lens group comprising said first lens group and said positive front sub-lens group so that these lens groups are integrally moved;
- providing a second focusing lens group comprising said positive rear sub-lens group; and
- in order to satisfy the following condition upon focusing from an infinite object distance to a closer object distance, moving said first focusing lens group and said second focusing lens group independently from the image side toward the object side so that the distance between said first focusing lens group and said second focusing lens groups are made shorter:

$$0.5 < X_{an}/X_{bn} < 1.0$$

wherein
- $H_1$ designates the radius of a bundle of axial light rays on the most object-side surface of said first lens group, when said object at an infinite photographing distance is in an in-focus state;
- H2R designates the radius of a bundle of axial light rays on the most object-side surface of said rear sub-lens group of said second lens group, when said object at an infinite photographing distance is in an in-focus state;
- $n_{PAV}$ designates the averaged refractive indexes of the d-line with respect to positive lens elements in said positive second lens group;
- $X_{an}$ designates a distance along which said first focusing lens group is advanced, the distance of which is defined by the position of said first focusing lens group corresponding to an infinite photographing distance and the position thereof corresponding to the shortest photographing distance; and
- $X_{bn}$ designates a distance along which said second focusing lens group is advanced, the distance of which is defined by the position of said second focusing lens group corresponding to an infinite photographing distance and the position thereof corresponding to the shortest photographing distance.

7. The focusing method for a wide-angle lens system according to claim 6, further satisfying the following conditions:

$$0.5 < X_{an}/X_{bn} < \Delta X_{ai}/\Delta X_{bi} < 1.0 - 0.1 < \beta < 0$$

wherein
- $\Delta X_{ai}$ designates the slope of a tangent at a point, corresponding to an infinite photographing distance, on the moving path of said first focusing lens group;

$\Delta X_{bi}$ designates the slope of a tangent at a point, corresponding to an infinite photographing distance, on the moving path of said second focusing lens group;

$$X_1 = \alpha X_2 + \beta X_2^2 \qquad 5$$

$X_1$ designates a distance along which said first focusing lens group is advanced, the distance of which corresponds to a photographing distance between an infinite photographing distance and the shortest photographing distance;

$X_2$ designates a distance along which said second focusing lens group is advanced, the distance of which corresponds to a photographing distance between an infinite photographing distance and the shortest photographing distance;

$\alpha$ designates a first coefficient; and $\beta$ designates a second coefficient.

* * * * *